US005239161A

United States Patent [19]

Lang

[11] Patent Number: 5,239,161

[45] Date of Patent: Aug. 24, 1993

[54] PLASMA FLUX SPRAYING METHOD OF TREATING THE SURFACE OF A SUBSTRATE, FOR EXAMPLE, AND APPARATUS FOR IMPLEMENTING THE METHOD

[75] Inventor: Martin H. Lang, Sassenheim, Netherlands

[73] Assignee: Agence Spatiale Europeenne, Paris, France

[21] Appl. No.: 856,535

[22] Filed: Mar. 24, 1992

[30] Foreign Application Priority Data

Mar. 26, 1991 [FR] France ............................... 91 03621

[51] Int. Cl.[5] ........................... B23K 9/06; B23K 9/00

[52] U.S. Cl. .......................... 219/121.47; 219/121.52; 219/121.5; 219/76.16

[58] Field of Search ...................... 219/121.47, 121.59, 219/121.51, 76.15, 76.16, 121.48, 121.52, 121.5

[56] References Cited

U.S. PATENT DOCUMENTS

| | | | |
|---|---|---|---|
| 3,573,090 | 3/1971 | Peterson . | |
| 3,660,630 | 5/1972 | Sunnen et al. | 219/76 |
| 3,796,591 | 3/1974 | Schoumaker | 219/121.47 |
| 4,909,914 | 3/1990 | Chiba et al. | 219/121.47 |
| 4,916,273 | 4/1990 | Browning | 219/121.47 |
| 5,090,482 | 2/1992 | Baron et al. | 169/46 |

FOREIGN PATENT DOCUMENTS 1177941 1/1970 United Kingdom .

*Primary Examiner*—Mark H. Paschall

*Attorney, Agent, or Firm*—Bell, Seltzer, Park & Gibson

[57] ABSTRACT

The invention relates to a method and to apparatus for treating the surface of a substrate, e.g. by depositing a coating thereon by plasma flux spraying, the method being of the type in which an electric arc is established inside a chamber between a cathode and an anode, in which an inert gas is injected into the chamber so that it is ionized on passing through the electric arc, thereby forming a high temperature plasma, and in which the plasma is ejected from the chamber through an ejection nozzle whose outlet orifice is in the form of a slit so as to project particles of the material for constituting the coating onto the substrate, the particles melting on contact with the plasma, thereby forming a coating on the substrate. The electric arc established between the anode and the cathode extends along an axis substantially parallel to the axis of the outlet slit of the ejection nozzle, the inert gas is injected into the chamber along a plurality of radial directions relative to the axis of the electric arc, and the material to be sprayed is carried by a carrier gas in ducts that open out for example inside the ejection nozzle.

8 Claims, 2 Drawing Sheets

PLASMA FLUX SPRAYING METHOD OF TREATING THE SURFACE OF A SUBSTRATE, FOR EXAMPLE, AND APPARATUS FOR IMPLEMENTING THE METHOD

The present invention relates to a plasma flux spraying method of treating the surface of a substrate, for example, the method being of the type consisting in establishing an electric arc in a chamber between a cathode and an anode, in injecting an inert gas into the chamber so that the gas is ionized on passing through the electric arc, thereby forming a high temperature plasma, and in ejecting the plasma from the chamber through an ejection nozzle whose outlet orifice is slit-shaped.

When the treatment consists in depositing a coating on a substrate, the coating-constituting material is generally in powder form, and the particles of the material are mixed with the plasma flux so that they pass to the molten state before being sprayed on the substrate.

BACKGROUND OF THE INVENTION

Of the spray techniques used for depositing a coating on a substrate, the above technique of plasma spraying presents certain advantages, in particular the advantage of being capable of reaching high temperatures (of the order of 5000° C. to 15000° C.) and of obtaining specific energy densities that enable any material which has a stable molten phase to be melted. This technique can thus be applied, in particular, to ceramics that have high melting points.

Nevertheless, the plasma spray devices presently in use are limited by constraints inherent to the principle on which they operate, and which enable only certain shapes of spray to be obtained at the outlet of the nozzle and on the substrate to be coated (essentially cone-like shapes).

As a result, the spray area on the substrate cannot be polygonal in shape, and in particular it cannot be rectangular. Furthermore, in some applications and for the purpose of limiting the number of passes required for depositing a coating of given thickness, it appears to be desirable for it to be possible to widen the layer that is deposited on each pass.

Attempts have been made to mitigate these limitations by trying to obtain other spray shapes, if possible while also increasing the width of the layer deposited on each pass.

In an article entitled "A plasma nozzle with a slit-like outlet" published in 1979 in the English journal "Welding Production", Vol. 26, No. 12, pp. 32-37, a study tends to show that an increase in the diameter of the outlet orifice of the ejection nozzle gives rise to an increase in the width of the deposited layer that is very small, in fact, and on the condition that two diametrically opposite injection inlets are provided into the nozzle for the powder material. In addition, the increase in the diameter of said nozzle outlet orifice is in any event limited since it reduces the temperature of the plasma jet which may be detrimental to the melting of the particles of material injected into the plasma. In conclusion, that article proposes a compromise which consists in giving a slit shape to the outlet orifice of the ejection nozzle and in providing two diametrically opposite inlets for injecting powder material into the nozzle.

Nevertheless, according to the Applicant, such a solution is not without its own drawbacks. Going from a cylindrical shape to a conical shape between the outlet of the chamber and the inlet to the ejection nozzle causes changes in the plasma flow velocity that prevent a layer being deposited which has uniform characteristics throughout. Specifically, the Applicant considers that these drawbacks are inherent to the fact that the inert gas inserted in the chamber flows coaxially with the electric arc created between the cathode and the anode.

In general, a particular object of the invention is to improve such a plasma spray method so as to mitigate the above-mentioned drawbacks while obtaining other advantages.

SUMMARY OF THE INVENTION

To this end, the invention provides a method of the above-specified type in which an electric arc is established between the anode and the cathode along an axis that is substantially parallel to the axis of the outlet slit of the ejection nozzle.

The inert gas may be injected into the chamber along a plurality of directions relative to the axis oft he electric arc.

When a coating is being deposited on a substrate, the material constituting the coating to be deposited on the substrate may be carried by a carrier gas, and may either be injected into the ejection nozzle, or else be ejected at the outlet of the nozzle in a direction substantially parallel to the flux direction at the outlet from the ejection nozzle.

The invention also provides apparatus for implementing the method of the invention, the apparatus being of the type comprising at least one chamber having a cathode and an anode, means for establishing an electric arc inside the chamber between the cathode and the anode, at least one feed duct for conveying an inert gas ionizable by the electric arc to form a high temperature plasma, an ejection nozzle having an outlet orifice in the form of a slit and an inlet orifice in communication with the chamber, wherein the chamber is elongate in shape having two end surfaces through which the cathode and the anode project respectively in axial alignment with each other to create an electric arc along an axis substantially parallel to the axis of the outlet slit of the ejection nozzle.

A plurality of inert gas inlet ducts may open out into the chamber along a plurality of radial directions about the axis of the electric arc established between the cathode and the anode, said ducts opening out into the chamber via orifices that are distributed along a plurality of rows aligned relative to the axis of the electric arc.

The chamber may extend parallel to the outlet slit of the ejection nozzle and substantially along the entire length thereof, the nozzle including an inlet orifice that is likewise in the form of a slit and that is in communication with the chamber over the entire length thereof.

When the apparatus is applied to depositing a coating on a substrate for example, at least one inlet duct for material in powder form may open out either inside the ejection nozzle, or else outside the ejection nozzle and in a direction substantially parallel to the flux direction of the plasma leaving the ejection nozzle.

Thus, with such an improved plasma spray method, it is possible to deposit strips of coating that are wider than those obtained in the past, while having uniform deposition qualities over the entire area of each deposited strip.

Coatings made in this way often perform the function of protecting the substrate from the surrounding environment. At present, there are many applications in most industrial fields (aerospace, automobile, electronics, . . . ) that require materials and/or components to be made that must operate in a protected environment.

The improvements provided by the invention are of a kind that improves this protection function in particular, particularly because of the possibility that is provided of applying this spray technique to materials having a high melting point. In addition, using the invention, it is possible to obtain spray shapes that are not surfaces of revolution, while nevertheless conferring properties of uniformity to the coating over its entire area and corresponding to the following characteristic parameters given by way of example: microstructure; thickness; hardness; toughness; bond strength; porosity; wear resistance; dielectric strength; thermal insulation; corrosion resistance; abradability; . . . . Coatings having at least some of these characteristics satisfied in a manner that is accurate and uniform are in over increasing demand, in particular in the aerospace industry, and more generally in most industrial fields, with the word "industrial" being taken in its widest meaning.

The improved spraying technique of the invention is not limited to depositing a coating on a substrate, and it may also be used for modifying the surface properties of various materials, e.g. by removing an oxide layer from the surface of a material by heat treatment of said surface. In particular, it is possible to replace freon as used for decontaminating surfaces, given that freon is an agent that destroys the ozone layer. Finally, the apparatus for implementing the method can be used as a source of heat in welding equipment and in plasma wind tunnels, for example.

BRIEF DESCRIPTION OF THE DRAWINGS

Embodiments of the invention are described by way of example with reference to the accompanying drawings, in which.

DETAILED DESCRIPTION

Figure 1:
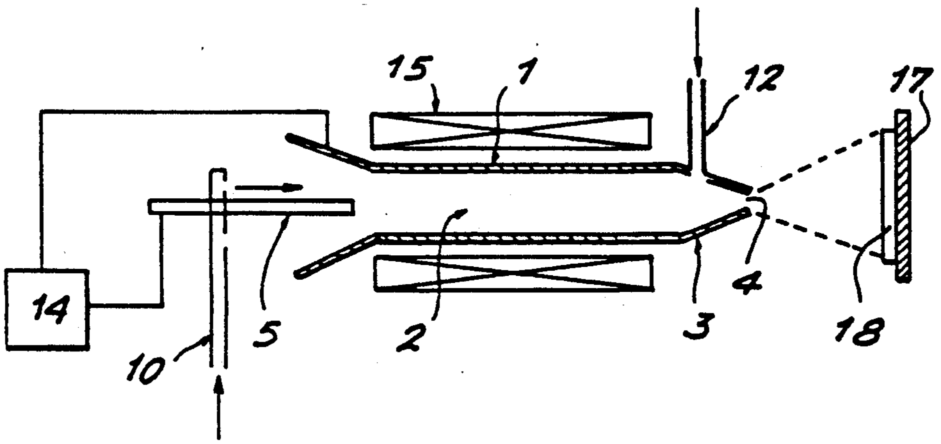
FIG. 1 (PRIOR ART)
FIG. 1 is a diagrammatic section view through a spray apparatus implementing a conventional plasma spray method for depositing a coating on a substrate.

Apparatus such as that shown diagrammatically in FIG. 1 serves to implement a conventional spray method of depositing a coating on a substrate by plasma spraying.

An anode 1 made of copper, for example, is annular in shape and delimits a chamber 2 hose two end surfaces form respectively the inlet and the outlet of the chamber. The chamber inlet 2 flares outwardly, while the chamber outlet is extended by an ejection nozzle 3 having an outlet orifice 4 that is circular in section.

A cathode 5 in the form of a rod is generally made of thorium-plated tungsten and is in axial alignment with the anode 1, having a free end that penetrates into the flared portion constituting the inlet to the chamber 2.

A duct 10 opens out in the vicinity of the cathode 5 for injecting an ionizable inert gas such as argon for example along the axis of the chamber 2.

A duct 12 opens out radially into the ejection nozzle 3 for injecting a material into the nozzle in the form of a powder carried by a carrier gas.

The apparatus also has a DC source 14 connected to the electrodes 1 and 5, cooling means (now shown) for the anode 1, and additional means for satisfying and optimizing the operating conditions that are required for implementing such a spraying method, for example such as having a magnetic field present for positioning, stabilizing, and compressing the plasma jet inside the chamber 2, safe magnetic field being obtained, for example, by means of a coil 15 mounted around the anode 1.

The method implemented by such an apparatus consists in establishing an electric arc between the cathode 5 and the anode 1, and injecting the inert gas coaxially with the electric arc and causing it to pass through the arc so as to ionize it. Thereby creating a high temperature plasma inside the chamber 2. This plasma flows inside the chamber 2 and is accelerated through the ejection nozzle 3. The particles of powder material conveyed by the duct 12 are injected into the plasma jet flowing through the nozzle 3 and they melt under the action of the high temperature of the plasma jet. The particles melted in this way are ejected via the outlet orifice of the nozzle and are sprayed onto the substrate 17 to form a layer of coating 18.

Figure 2:
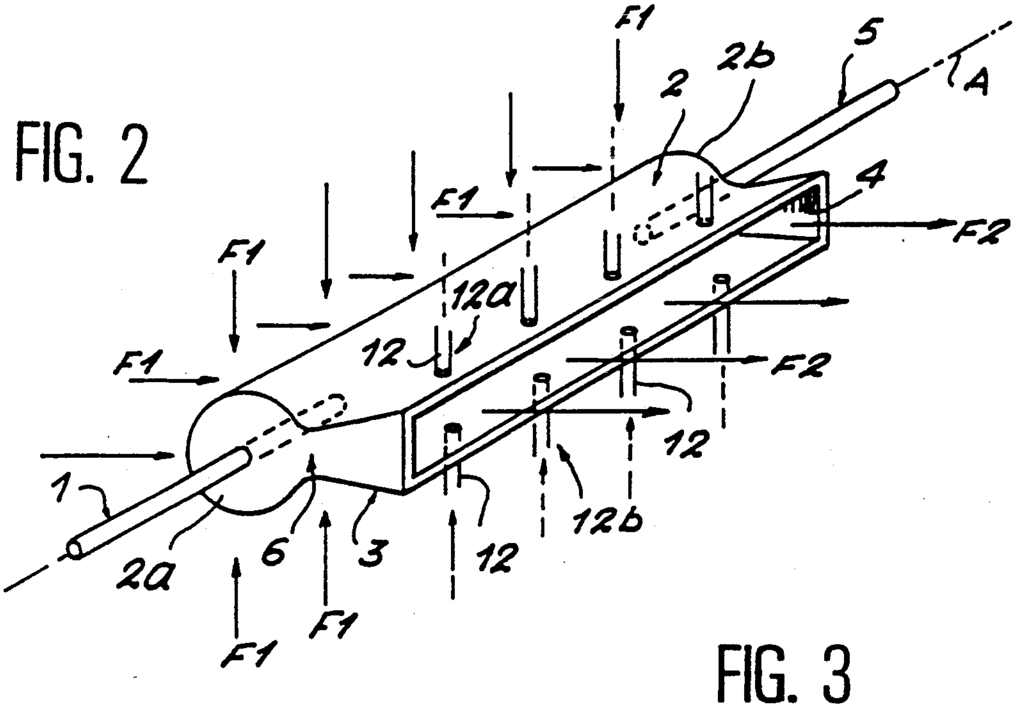
FIG. 2 is a diagrammatic perspective view of an apparatus implementing the method of the invention also for depositing a coating on a substrate.
Figure 3:
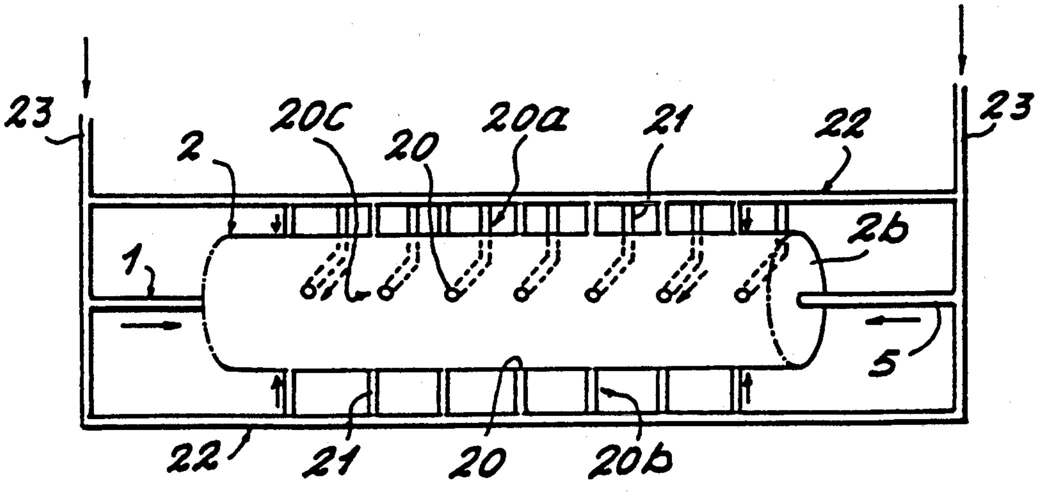
FIG. 3 is a diagram showing the various directions in which the inert gas is injected into the chamber of the apparatus shown in FIG. 2.

The improvements provided by the invention are shown diagrammatically in FIGS. 2 and 3.

The chamber 2 and the ejection nozzle 3 are no longer in coaxial alignment as before, and the outlet orifice 4 of the nozzle is in the form of a slit. More precisely, the chamber 2 extends parallel to the outlet slit 4 of the ejection nozzle 3 and over substantially the same length as the slit. The ejection nozzle 3 is divergent and is flared in section, having an inlet slit 6 opening out into the chamber 2 along the entire length thereof.

The chamber has two plane end surfaces or walls 2*a* and 2*b* respectively having the anode 1 and the cathode 5 passing therethrough. Each of these two electrodes 1 and 5 is in the form of a rod, and the rods are in axial alignment with each other. In a manner similar to the apparatus shown in FIG. 1, the electrodes 1 and 5 are connected to a DC source, and the chamber 2 is surrounded by a coil 15, and cooling means (not shown) surround the chamber 2.

The inert gas is injected into the chamber 2 via a set of orifices distributed around and along the chamber. More precisely, in the example shown, at least three rows 20*a*, 20*b*, and 30*c* of orifices 20 are provided. The rows 20*a* and 20*b* are diametrically opposite and situated on opposite sides of the inlet slit 6 to the ejection nozzle 3, while the row 20*c* is disposed diametrically opposite to said inlet slit.

Thus, the directions F1 in which the inert gas is injected into the chamber 2 and the outlet direction F2 of the plasma can be considered overall as forming a four-branch Greek cross (FIG. 3).

Each orifice 20 in the same row 20*a*, 20*b*, or 20*c* is connected by a link duct 21 to an intermediate duct 22 which in turn communicates with a main duct 23 connected to an inert gas feed source (not shown).

In the apparatus of the invention, it is advantageous to use tubular electrodes 1 and 5 so that inert as can also be injected through the electrodes.

Finally, the apparatus includes a plurality of ducts 12 opening out into the ejection nozzle 3 to inject powder material therein. These ducts 12 are aligned, for example, in two opposite rows 12*a* and 12*b* which extend parallel to the outlet slit 4 of the ejection nozzle 4 (FIG. 2).

The apparatus of the invention reproduces in general terms all of the means required for performing a conventional plasma spray method, but using different shapes and dispositions.

In operation, the electric arc established between the electrodes 1 and 5 runs substantially along the axis of the chamber 2, i.e. parallel to the outlet slit 4 of the nozzle, and the inert gas is injected into the chamber along the various directions distributed along and around the chamber and converging radially and not coaxially on the axis of the electric arc, and along the electric arc.

In a variant embodiment of the apparatus shown in FIGS. 2 and 3, the material for forming the coating 18 on the substrate 17 is not injected into the ejection nozzle 3.

Figure 4:
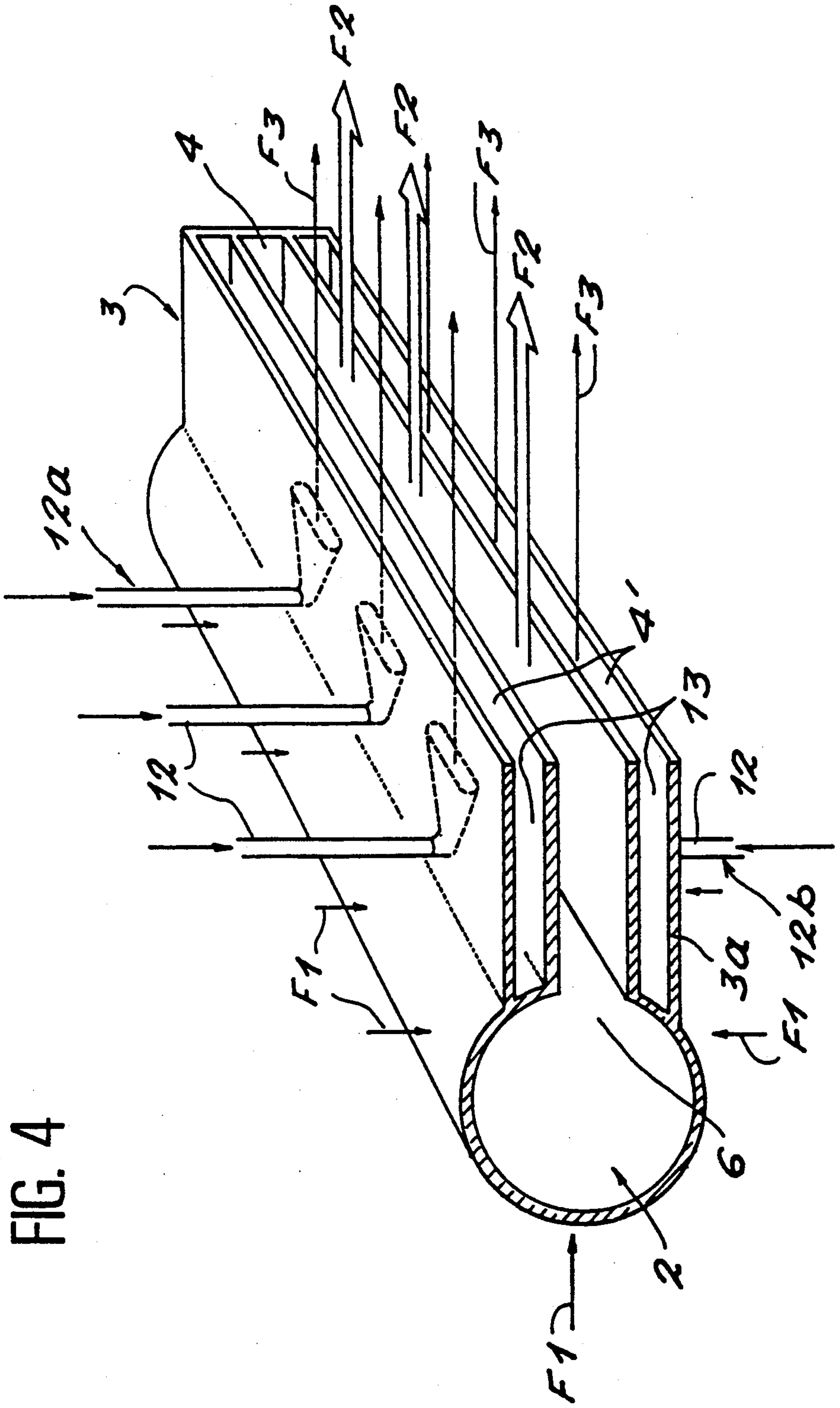
FIG. 4 is a diagrammatic perspective view of a variant of the apparatus showing FIGS. 2 and 3 for implementing the invention.

More precisely, with reference to FIG. 4, the body 3*a* of the ejection nozzle 3 includes two additional outlet slits 4' which extend substantially along the entire length of the outlet slit 4. These two slits 4' are situated on either side of the slit 4, and each of them constitutes the outlet orifice from a respective cavity 13 formed in the body 3*a* of the ejection nozzle 3. The rows 12*a* and 12*b* of inlet ducts 12 for material to be sprayed on the substrate open out into respective ones of the cavities 13, thereby ejecting material through the slits 4' in a direction F3 substantially parallel to the direction F2 of the plasma flux leaving the slit 4 of the ejection nozzle 3.

In this variant, the particles of material are no longer mixed with the plasma inside the ejection nozzle 3, but instead at the outlet thereof, i.e. in a region where the temperature of the plasma is not so high. It is then possible to use materials such as plastics and polymers, for example, i.e. materials that cannot withstand temperatures high enough to enable them to be injected into the nozzle 3.

Naturally, the invention is not limited in any way to the implementation described above purely by way of example when depositing a coating on a substrate. In particular, the plasma flux leaving the ejection nozzle constitutes a source of heat that can be used for performing that treatments without necessarily requiring material to be sprayed on the surfaces to be treated.

I claim:

1. Apparatus for treating a surface of a substrate by plasma flux spraying, comprising at least one chamber, a single plasma torch having a cathode and an anode, means for establishing an electric arc inside the chamber between the cathode and the anode, at least one feed duct for conveying an inert gas ionizable by the electric arc to form a homogeneous high temperature plasma, an ejection nozzle having an outlet orifice in the form of a slit and an inlet orifice in communication with the chamber, wherein the chamber is elongate in shape having two end surfaces through which the cathode and the anode project respectively in axial alignment with each other to create an elongate electric arc along an axis substantially parallel to the axis of the outlet slit of the ejection nozzle.

2. Apparatus according to claim 1, comprising a plurality of inert gas inlet ducts opening out inside the chamber along a plurality of racial directions relative to the axis of the electric arc established between the cathode and the anode.

3. Apparatus according to claim 2, wherein the inert gas feed ducts open out into the chamber via orifices which are distributed in a plurality of rows.

4. Apparatus according to claim 3, comprising three rows of orifices, the rows being diametrically opposite to each other and being situated on opposite sides of the inlet slit of the ejection nozzle, while the row is diametrically opposite to said inlet slit.

5. Apparatus according to claim 2, wherein the cathode and the anode are hollow, and they form inlet ducts for the inert gas to be ionized.

6. Apparatus according to claim 1, for depositing a coating on a substrate, wherein the apparatus comprises at least one inlet duct for material that is to form the coating, which duct opens out inside the ejection nozzle.

7. Apparatus according to claim 1, for depositing a coating on a substrate, wherein the apparatus comprises at least one inlet duct for material that is to form the coating on the substrate, which duct opens out at the outlet of the ejection nozzle via at least one slit parallel to the outlet slit of the ejection nozzle.

8. Apparatus according to claim 1, wherein the chamber extends parallel to and over substantially the same length as the outlet slit of the ejection nozzle, the inlet orifice of the chamber extending substantially along the entire length of the chamber.

* * * * *

UNITED STATES PATENT AND TRADEMARK OFFICE

CERTIFICATE OF CORRECTION

PATENT NO. : 5,239,161

DATED : August 24, 1993

INVENTOR(S) : Martin H. Lang

It is certified that error appears in the above-identified patent and that said Letters Patent is hereby corrected as shown below:

Column 2, line 24, "oft he" should be -- of the --.

Column 3, line 23, "over" should be -- ever --.

Column 3, line 53, "showing" should be -- shown in --.

Column 3, line 62, "hose" should be -- whose --.

Column 4, line 16, "safe" should be -- said --.

Column 4, line 22, ". Thereby" should be --, thereby --.

Column 4, line 56, "30c" should be -- 20c --.

Column 5, line 2, "as" should be -- gas --.

Column 5, line 32, "The" should be -- Two --.

Column 6, line 1, "that" should be -- heat --.

Column 6, line 21, [illegible]

Signed and Sealed this

Seventh Day of June, 1994

Attest:

BRUCE LEHMAN

*Attesting Officer* *Commissioner of Patents and Trademarks*